United States Patent [19]

Ryan

[11] 4,383,260

[45] May 10, 1983

[54] LOW PROFILE ELECTRIC FIELD SENSOR

[75] Inventor: Paul A. Ryan, Columbus, Ohio

[73] Assignee: Minnesota Mining and Manufacturing Co., Saint Paul, Minn.

[21] Appl. No.: 248,621

[22] Filed: Mar. 27, 1981

Related U.S. Application Data

[63] Continuation-in-part of Ser. No. 41,853, May 24, 1979, abandoned.

[51] Int. Cl.[3] ........................ H01Q 1/26; G01W 1/00

[52] U.S. Cl. .................................... 343/701; 343/829; 73/170 R

[58] Field of Search ................ 343/700 MS, 701, 708, 343/709, 720, 829; 73/170 R; 324/72; 455/291

[56] References Cited

U.S. PATENT DOCUMENTS 2,885,545 5/1959 Potter .................................. 343/701

3,714,659 1/1973 Firman ................................ 343/701

3,827,053 7/1974 Willie et al. ......................... 343/701

3,921,177 11/1975 Munson ....................... 343/700 MS

*Primary Examiner*—Eli Lieberman

*Attorney, Agent, or Firm*—Pollock, Vande Sande and Priddy

[57] ABSTRACT

A low profile electric field sensor is arranged to sense electric field potentials with respect to a local ground plane. The sensor includes an antenna in a generally planar format with a major dimension extending generally parallel to the local ground plane. To maintain signal to noise ratio, while at the same time minimizing the height of the antenna so as to provide a low profile, the antenna is coupled to a charge amplifier. The charge amplifier comprises an operational amplifier, preferably with a capacitor feedback between output and an inverting input, and the antenna is conductively connected to the inverting input.

10 Claims, 5 Drawing Figures

LOW PROFILE ELECTRIC FIELD SENSOR

RELATED APPLICATION

This application is a continuation-in-part of my prior co-pending application Ser. No. 41,853, filed May 24, 1979, now abandoned.

FIELD OF THE INVENTION

The present invention relates to a low profile sensor for sensing electric potential with respect to a local ground plane.

BACKGROUND OF THE INVENTION

The need to sense electric field vectors, or potentials with respect to a ground plane, arises in a variety of circumstances, and has been met in the prior art by the use of antennas. One well known use of antennas is for the sensing of radio waves. Such radio waves may be intelligence-bearing modulated signals produced by a transmitter, or the result of atmospheric disturbances, such as lightning, as disclosed, for example, in U.S. Pat. No. 4,023,408. Although electric field sensing can be associated with a variety of structures and vessels, e.g., buildings and ships, the provision of electric field sensors for aircraft has been beset with problems unique to the aircraft environment.

The desire to increase the dimensions of the sensor, for good performance, e.g., signal to noise ratio, is at odds with the desire, in the aircraft environment to minimize the extension of the antenna beyond the airframe because such extensions reduce the aerodynamic performance of the aircraft.

Accordingly, the provision of a low profile antenna with good electrical properties, i.e., signal to noise ratio, is an advantage in the aircraft environment; it is also an advantage in non-aircraft environments for the reasons of economy, reduction of complexity and aesthetics.

A transmitter of electromagnetic radiation (either intelligence-bearing or natural) will produce a time varying electric field at a distant location. The electric field vector is sensed by detecting a potential with respect to the local ground plane which is induced in the sensor because of the field. To sense the presence of the electric field, the potential at a point in space is measured with respect to the local ground plane. This potential can be measured, for example, by the use of an antenna which is simply a metallic structure in which a potential is induced by the electric field. Since the antenna is a real (as opposed to an ideal) structure, it extends over an infinite number of points in space, each of different distance from the local ground plane. The potential actually induced in the antenna then is the integral of the potential induced at an infinite number of points P on the antenna, each a different distance from the local ground plane. Since the length of the antenna is assumed to be a small portion of a wavelength, propagation time effects can be neglected. Accordingly, we can assign an effective height $H_e$ to the antenna such that the potential induced in the antenna is the same as the potential that would be induced in the antenna if all the material in the antenna were concentrated at a distance $H_e$ from the local ground plane, that is, the potential $e_a$ is $H_e\sigma$, where $\sigma$ is the electric field vector.

Because of the combined presence of two conductors, i.e., the local ground plane and the antenna, the combination will also exhibit electrical capacitance. An equivalent circuit for the antenna arrangement comprises a voltage generator (of magnitude proportional to the product of the electric field and the effective height of the antenna) in series with the capacitance of the antenna with respect to the local ground plane. Whip antennas normally used on aircraft have effective heights ranging between 0.1 and 0.25 meters, and antenna capacitance varying in a range between 10 and 50 pf. These parameters are a compromise between the desire to achieve larger effective heights, for improved signal to noise ratio, and the desire to reduce the height of the antenna to avoid disturbing the aerodynamic performance of the aircraft.

The prior art also evidences attempts to eliminate the whip, and instead use an antenna which is generally planar in shape, with a major dimension extending generally parallel to the local ground plane, i.e., a plate. Such a sensor is illustrated in FIG. 2. In a plate type sensor, which is usually oriented generally parallel to the local ground plane, the effective height of the antenna lies somewhere between the extreme edges of the plate and the local ground plane. Likewise, the antenna capacitance, then, is the capacitance between the plate and the ground plane.

With this arrangement, the effects of the previous compromise are highlighted. That is, improved aerodynamic performance can be achieved by reducing the effective height of the antenna which, in the case of the plate sensor, is approximately the actual height. However, this has a strong impact on the potential induced into the antenna which may degrade the signal to noise ratio. Furthermore, in order to prevent the capacitance of any connecting cable from further attenuating the induced potential, the prior art used a voltage amplifier co-located with the flat plate sensor, and such a voltage amplifier is also shown in FIG. 2. The resulting compromise has resulted in commercial products with antenna effective heights ($H_e$) at least greater than 5 cm.

For comparison purposes, FIG. 3 plots noise level and voltage amplifier output voltage as a function of effective antenna height. Reviewing these two curves, it will be apparent that above some low threshold, the noise level increases in proportion to effective antenna height and voltage amplifier output also increases linearly with effective height, although the output voltage of the voltage amplifier increases with increasing effective antenna height at a faster rate than noise. At the chosen effective antenna height of about 5 cm. (i.e., point D in FIG. 3), signal to noise ratio (for about a 100 kHz noise bandwidth) is about 1.5. Better S/N is easily achieved by increasing antenna effective height.

It is therefore, one object of the present invention to provide a low profile electric field sensor which provides usable output signals, and at the same time, has an effective antenna height which is less than devices available today. It is another object of the present invention to provide low profile electric field sensor which minimizes aerodynamic disturbance, without penalty to electrical properties of the sensor.

SUMMARY OF THE INVENTION

These and other objects of the invention are met by employing an amplifier which is sensitive to charge Q rather than the voltage amplifier used in the prior art. Such amplifier (hereinafter a quasi-charge amplifier) may comprise an operational amplifier with a feedback element between output and an inverting input terminal, with the flat plate antenna element directly connected to the inverting input terminal of the amplifier. In contrast to the voltage amplifier, which results in a linear change of output voltage with effective antenna height, the quasi-charge amplifier output voltage is insensitive to the effective antenna height, as is also illustrated in FIG. 3. Since the noise level also increases with effective antenna height, the use of a quasi-charge amplifier, which renders the output voltage insensitive to effective antenna height, allows one to select a relatively low effective antenna height without degrading S/N. In addition, by choosing a relatively low effective height, S/N may actually be improved.

In view of the foregoing, it will be apparent that the invention provides a low profile electric field sensor for sensing electric field in relation to a local ground plane comprising:

an antenna comprised of metallic material with generally planar form, having a major dimension generally parallel to said local ground plane, quasi-charge amplifier means, responsive to charge and producing an output voltage, and connecting means conductively connecting said antenna to said charge amplifying means.

BRIEF DESCRIPTION OF THE DRAWINGS

In order to enable those skilled in the art to make and use the invention, after reviewing this description, the invention will be further detailed in the following portions of the specification when taken in conjunction with the attached drawings in which like reference characters identify identical apparatus and in which.

DESCRIPTION OF PREFERRED EMBODIMENTS

Figure 4A:
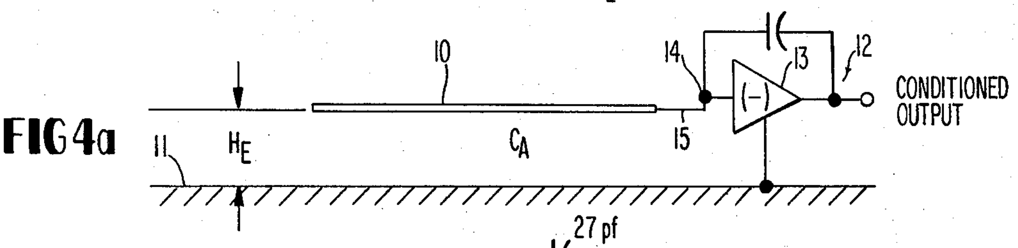
FIGS. 4A and 4B are block and schematic diagrams, respectively, of the inventive sensor.

As shown in FIG. 4A, an antenna 10, comprised of a metallic material, has a generally planar format, having a major dimension generally parallel to a local ground plane 11, which may, for example, be the skin of an aircraft. FIG. 4A also illustrates the effective antenna height, i.e., the length of a normal to the ground plane, extending between ground plane and an edge of the antenna 10. Also illustrated in FIG. 4A is one embodiment of the quasi-charge amplifier, comprising a charge amplifier 12 including an operational amplifier 13, having an inverting input 14. A conductor 15 is connected between the inverting input 14 and the antenna 10. The operational amplifier 13 includes a negative feedback capacitor C connected between the output and the inverting input 14.

Figure 4B:
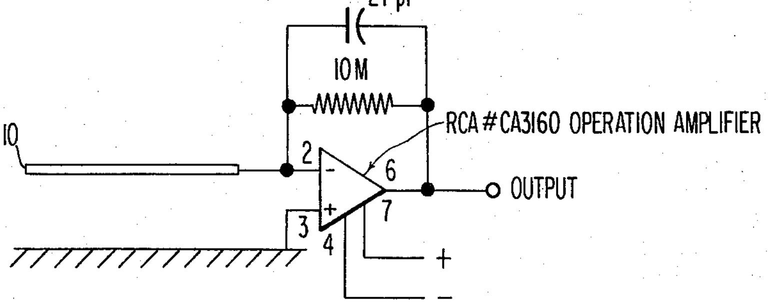

FIG. 4B is a circuit diagram in which the operational amplifier is an RCA CA 3160, and the feedback capacitor has a value of 27 pf. A feedback resistor, 10 megohms, is employed to bias the charge amplifier.

Charge amplifiers themselves are known, see *Shock and Vibration Measurements*, published by Columbia Research Laboratories, Inc. (Woodlyn, Pennsylvania 1973) and pages 116–117 of "Measurements in Mechanical Dynamics" by David Keast (McGraw-Hill 1967).

Figure 1:
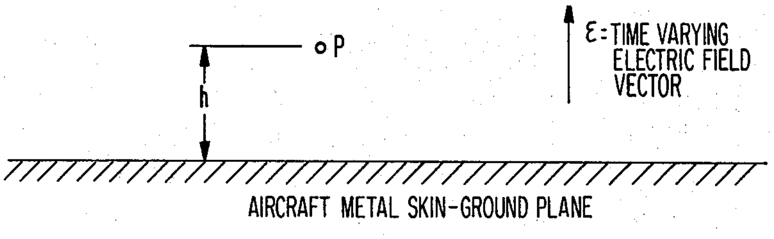
FIG. 1 represents the measurement problem.
Figure 2:
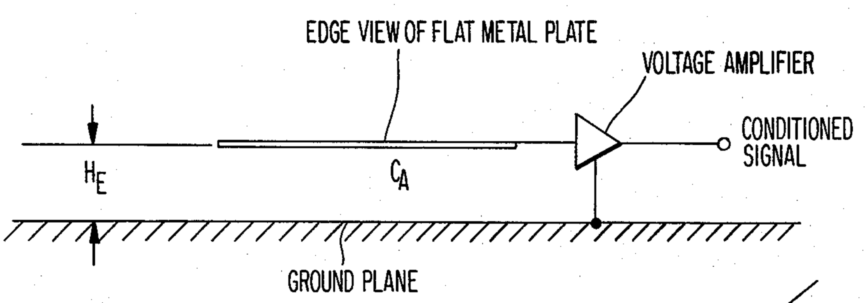
FIG. 2 represents a "prior art" solution.
Figure 3:
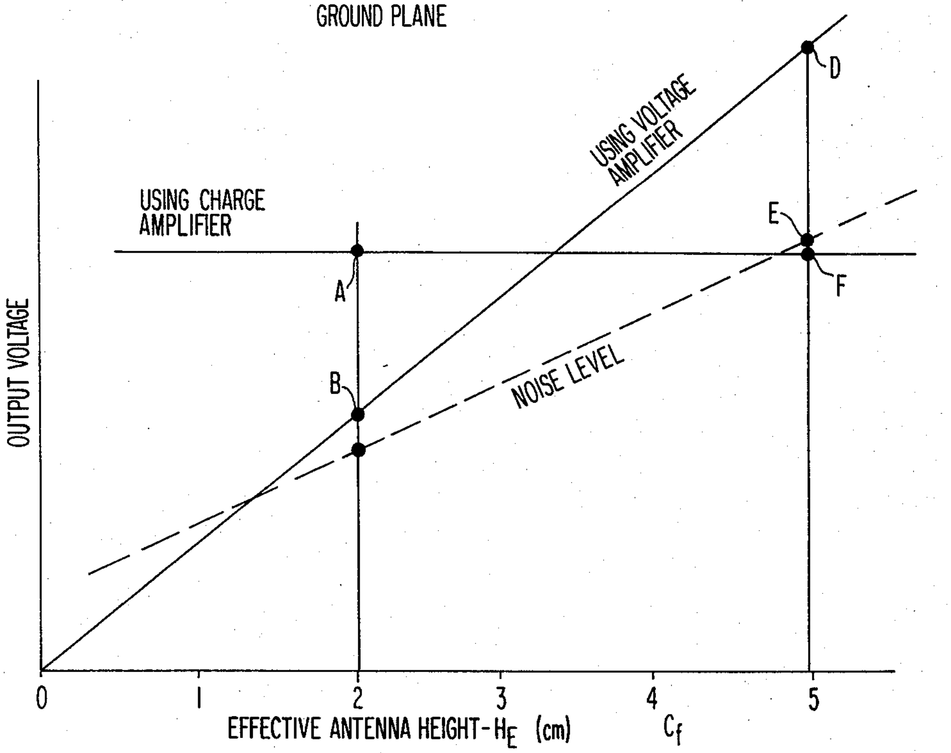
FIG. 3 presents curves of prior art and inventive system outputs for a constant electric field as a function of effective height.

FIG. 3 illustrates a curve of amplifier output voltage as a function of effective antenna height, for plate sensors having either a charge amplifier, (or a quasi-charge amplifier) or a voltage amplifier. A review of FIG. 3 illustrates that the output voltage of the charge amplifier (or quasi-charge amplifier) is insensitive to antenna effective height. This is believed to result from the fact that antenna capacitance is inversely proportional to effective height (at least for plate type sensors). A voltage amplifier has its output voltage reduced toward zero as the effective height of the plate type sensor is decreased. On the other hand, the charge (or quasi-charge) amplifier output voltage remains essentially unchanged with changing effective height since the charge (or quasi-charge) amplifier amplifies charge Q rather than voltage. While input voltage (V) goes down with decreases in height, capacitance (c) increases, and charge Q ($Q=cV$) remains unchanged. As a result, changes in effective height are not reflected in a variation of output voltage as shown in FIG. 3. With the freedom granted by the use of the charge (or quasi-charge) amplifier, the effective antenna height can now be reduced to a level consistent with good aerodynamic performance and, for example, I prefer to employ an effective antenna height of about 2 cm., although those skilled in the art will appreciate that the effective antenna height can be varied without departing from the spirit of the invention. It will be realized, however, that the use of the charge (or quasi-charge) amplifier allows the effective antenna height to be reduced below the typical prior art value of about 5 cm., without, at the same time, reducing the signal to noise ratio. In fact, a review of FIG. 3 will reveal that the signal to noise ratio at about a 2 cm. effective antenna height is about 2, that is, $\frac{1}{3}$ better than the prior art signal to noise ratio of about 1.5 with an antenna effective height of 5 cm.

As has been mentioned, I can use a charge amplifier, but that is only one embodiment of the invention. In general, I believe that any amplifier can be used which is responsive to the charge Q provided by the potential sensor, or antenna, to convert the chage magnitude to a useful signal, such as voltage. Essentially, any amplifier that presents a low input impedance via degenerative feedback can be used. Charge amplifiers, which are themselves known, which use capacitive feedback (or a complex feedback impedance with net capacitive reactance) such as in FIG. 4*a* or 4*b* can be used. Likewise, purely resistive feedback elements can also be used, so long as the input impedance is zero or virtually zero. While in principal, inductive reactance feedback elements can also be used these may introduce undesirable resonance with the antenna's capacitive reactance and are therefore not preferred. Accordingly, I have adopted the term quasi-charge amplifier to refer to amplifying devices which can produce a usable output signal by sensing the charge Q delivered by an antenna.

The frequency range over which advantage may be realized from the use of the invention extends from below the broadcast band (e.g., about 30 kHz) up into the VHF range (e.g., 300 MHz). At increasing frequencies, the decrease in wavelength means that the advantage obtained by using the invention is reduced, but still present through VHF. The invention provides greatest advantage in the broadcast band and below (e.g., 50 kHz–1 MHz). This is simply seen by assigning a reasonable antenna height of $\frac{1}{8}$ wavelength. At 30 kHz $\frac{1}{8}$ wavelength is 1.25 km; at 300 kHz, $\frac{1}{8}$ wavelength is 125 m; at 3 MHz, $\frac{1}{8}$ wavelength is 12.5 m; at 30 MHz, $\frac{1}{8}$ wavelength is 1.25 m and at 300 MHz, $\frac{1}{8}$ wavelength is 12.5 cm. Each of these $\frac{1}{8}$ wavelengths is much larger than my preferred 2 cm antenna height. Yet with the use of a charge or quasi-charge amplifier I obtain S/N ratio which is at least acceptable (i.e., for example, at least 1.5) with much smaller antenna height, e.g., 2 cm.

What is claimed is:

1. A low profile electric field sensor adapted for use in sensing atmospheric weather disturbances by sensing an RF electric field at 1 MHz or below in relation to a local ground plane in which an output signal is produced which is relatively independent of height from said local ground plane within a given range of heights, comprising:

an antenna comprised of metallic material, generally planar in form, having a major dimension generally parallel to said local ground plane, quasi-charge amplifying means responsive to charge and producing an output signal, and connecting means conductively connecting said antenna to said quasi-charge amplifying means, whereby sensor height can be freely selected within said given range without accepting a reduction in output signal.

2. The sensor of claim 1 wherein said quasi-charge amplifying means includes an operational amplifier, capacitive feedback means connecting an output of said amplifier to an inverting input, and wherein said connecting means is coupled to said inverting input.

3. The sensor of claims 1 or 2 in which said antenna extends no further than 3 cm. from said local ground plane.

4. The sensor of claims 1 or 2 in which said antenna has an effective height of less than or equal to 3 cm. from said local ground plane.

5. The sensor of claims 1 or 2 in which said antenna has an effective height of 2 cm.

6. A low profile electric field sensor adapted for use in sensing atmospheric weather disturbances by sensing an RF electric field at 1 MHz or below in relation to a local ground plane comprising:

an antenna comprised of metallic material with generally planar form having a major dimension generally parallel to said local ground plane, and an effective height from said local ground plane of no more than 3 cm; and amplifying means including a quasi-charge amplifier conductively connected to said antenna.

7. The apparatus of claim 6 wherein said amplifying means includes an amplifier with feedback impedance of net capacitive reactance.

8. The apparatus of claim 6 wherein said quasi-charge amplifier comprises an operational amplifier with an inverting input and an output, capacitive feedback means coupled between said output and said inverting input, and said antenna coupled to said inverting input.

9. The sensor of claim 1 in which said quasi-charge amplifying means has a low input impedance.

10. The sensor of claim 6 or 9 which operates in the vicinity of 50 KHz.

* * * * *